United States Patent [19]

Rice et al.

[11] 4,137,934

[45] Feb. 6, 1979

[54] VALVE CONSTRUCTION

[75] Inventors: Donald D. Rice; Herbert H. Walton, both of Marshalltown, Iowa

[73] Assignee: Fisher Controls Company, Marshalltown, Iowa

[21] Appl. No.: 772,031

[22] Filed: Feb. 25, 1977

[51] Int. Cl.² .......................... F16K 1/44; F16K 1/46
[52] U.S. Cl. .................................. 137/270; 137/454.6; 137/316; 251/282
[58] Field of Search ............. 137/454.5, 454.6, 625.35, 137/316, 270, 454.2; 251/282, 362

[56] References Cited

U.S. PATENT DOCUMENTS

| | | | |
|---|---|---|---|
| 2,058,868 | 10/1936 | Hansen | 137/454.2 |
| 2,159,452 | 5/1939 | Samaras | 137/454.6 |
| 2,897,836 | 8/1959 | Peters et al. | 251/282 X |
| 3,001,550 | 9/1961 | Engel et al. | 137/454.5 X |
| 3,298,389 | 1/1967 | Freeman | 137/454.6 |
| 3,439,701 | 4/1969 | Stella | 137/454.6 X |
| 3,572,382 | 3/1971 | Luthe | 137/625.35 |

FOREIGN PATENT DOCUMENTS 327426  3/1958  Switzerland .................... 137/454.6

*Primary Examiner*—Arnold Rosenthal
*Attorney, Agent, or Firm*—Lawrence L. Limpus

[57] ABSTRACT

A single-ported double-seated valve mechanism is a valve body means with an inlet and outlet communicated by a flow passage and a chamber for receiving valve trim. A bonnet is secured to the valve body means. Valve trim is fixedly secured to the bonnet and positioned within the chamber. The bonnet and valve trim may be removed from the valve as a unit. An outwardly extending portion of the bonnet is sized to fit within the valve body wherein the valve body serves as a support or vise.

3 Claims, 4 Drawing Figures

VALVE CONSTRUCTION

BACKGROUND OF THE INVENTION

1. Field of the Invention

This invention relates to a valve mechanism. More particularly, it relates to a globe-style valve mechanism wherein an automatic actuator, e.g., of the pneumatic, hydraulic, or electrical sort, may be employed.

2. Description of the Prior Art

Heretofore, it has been common in cage-guided globestyle valves having automatic actuators to provide a hollow valve body in which the valve cage is retained, the cage being installed in the body through an opening in the body wall. To close this opening in the wall, a valve bonnet is employed which may be bolted or screwed to the body. A valve plug is commonly reciprocally disposed within the valve cage, and attached to the plug is a valve stem which extends through a set of packing in the valve bonnet to the exterior of the valve, the packing effecting a sliding seal between the bonnet and the stem.

Rigidly attached to the outer surface of the valve bonnet is the actuator. This actuator is usually equipped with an actuator stem concentric with and extending toward the valve stem, and the actuator stem and valve stem are connected together by any suitable means such as an elongated nut which engages threads on the ends of these shafts.

Valves which are generally exemplary of this prior art are disclosed in U.S. Pat. No. 3,572,382 to Luthe.

While such valves have been quite suitable in many application, nevertheless they suffer from certain disadvantages. In order to remove the plug-and-cage trim for repair or replacement in such a prior art valve, it has been necessary to disconnect the actuator stem from the valve stem, disconnect the actuator from its source of pneumatic or hydraulic pressure, and remove the valve bonnet and actuator from the valve body. Following this operation, the valve plug and the cage may be removed from the body. Typically, upon reassembly of such prior art valves the spacing between the ends of the actuator stem and valve stem must be carefully adjusted to insure that a desired predetermined seating force is applied by the actuator spring to hold the valve plug in a valve-closed position against the cage seat in the absence of a control pressure applied to the actuator. Moreover, in prior art valves in which the cage is threadedly retained at one of its ends by the inner portion of the valve bonnet, so that upon removal of the valve bonnet from the valve the plug and cage are removed with the bonnet, extreme care must be exercised in handling the bonnet and cage assembly (usually with the actuator attached), to prevent damage to the exterior of the cage during storage or during removal of the valve cage from the bonnet. A further common disadvantage of these valves has been that the pneumatic or hydraulic actuator control pressure piping must ordinarily be disconnected in order to remove the valve bonnet and trim.

SUMMARY OF THE INVENTION

It is an object of this invention to provide an improved valve assembly having a plug and cage style trim.

A further object is to provide a valve from which the trim may be removed for inspection or replacement without a disconnection of a valve bonnet and/or valve actuator from the valve body which contains the trim.

Another object is to provide a valve structure wherein the spacing between the actuator shaft and the valve plug need not be adjusted upon assembly or reassembly of the valve in order to achieve proper valve shutoff characteristics and actuator operation.

A still further object is to provide a valve construction wherein the valve body may be used as a support and retaining means, or vise, during removal of the cage and plug of the valve trim from the other valve parts.

DESCRIPTION OF THE DRAWINGS

Reference is now made to the drawings, in which.

DESCRIPTION OF A PREFERRED EMBODIMENT

Figure 1:
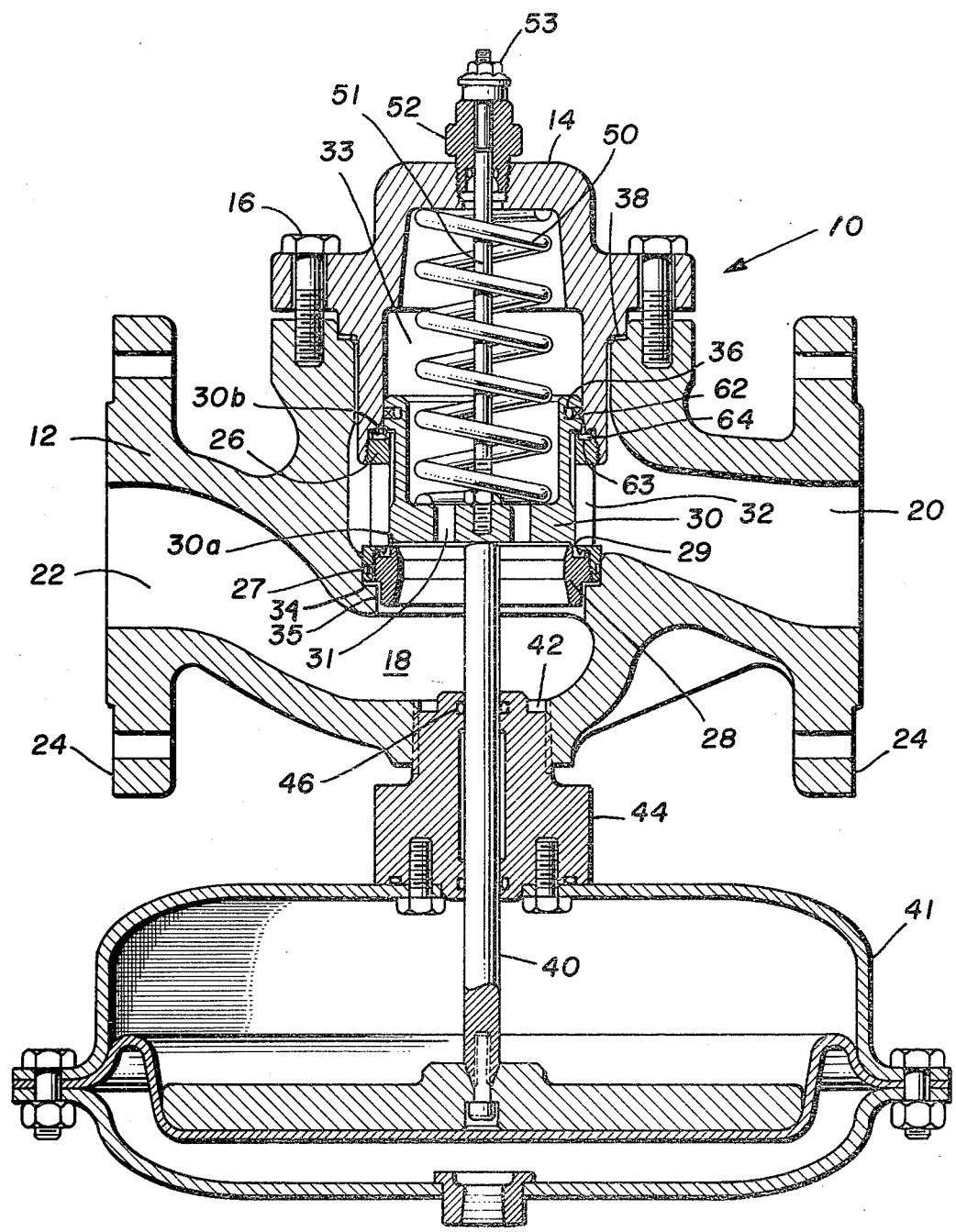
FIG. 1 is a cross-sectional view of a valve mechanism embodying the principles of the present invention.

Referring to FIG. 1 of the drawings there is illustrated a valve mechanism 10 embodying the present invention. The valve mechanism 10 comprises a valve housing or valve body means defined by a valve body 12 and a valve bonnet 14 secured together by suitable fastening means, as, for example, a plurality of bonnet bolts 16. Defined within the valve body 12 is a fluid flow passageway 18 which communicates an inlet 22 with an outlet 20. The valve body is provided with suitable flanges 24 which are adapted to be connected to flanges of a pipeline or fluid conduit in a conventional manner. It will be readily apparent that other means may be employed to connect the valve body 12 in fluid circuit to a pipeline.

Disposed within the valve body means is a valve cage 26, seat ring 28 threaded secured to the valve cage 26, and a valve plug 30 slidably guided within the valve cage 26 for movement toward and away from the seat ring 28. The valve cage 26 comprises a tubular sleeve-like member having a plurality of characterized openings or ports 32 in the wall thereof. Seal ring 27 is positioned in a recess about the valve cage 26 for sealing between the valve cage 26 and the valve body 12.

The valve seat ring 28 has an opening therethrough forming a part of the fluid flow passageway 18 in the valve body 12. The top of the seat ring 28 is engaged by the valve cage 26. A first seal or port seal 29 is disposed in a recess in the upper surface of seat ring 28 and secured between the abutting surfaces of seat ring 28 and valve cage 26. The port seal 29 is adapted to be engaged by the lower surface of the valve plug 30 to seal fluid flow through the passageway 18.

Disposed in a recess adjacent the upper end of valve plug 30 is a ring 62 for minimizing vibration of valve plug 30 within valve cage 26. The ring 62 reduces the fluid flow through the small annular space between valve plug 30 and valve cage 26. An o-ring 36 is disposed within the recess inwardly of ring 62. The o-ring 36 is compressed by ring 62 to maintain slidable contact between ring 62 and the surface of chamber 33 above valve plug 30. Bores 31 extend through valve plug 30 for equalizing pressure in the chamber 33 above the valve plug 30 with the pressure below the valve plug 30, thereby controlling the magnitude of the unbalanced fluid force acting on the valve plug 30.

The seat ring 28 and valve cage 26 with seal ring 27 are threadedly secured to the valve bonnet 14. A gasket 38 is sandwiched between the valve bonnet 14 and the valve body 12. The parts are retained in assembled relationship with the valve body by tightening bonnet bolts 16 to clamp the bonnet 14 to the valve body 12.

Valve plug 30 is movable reciprocally within the valve cage 26 by means of the actuator stem 40 which abuts, but is not attached to, the valve plug 30. The end of the actuator stem 40 opposite the valve plug 30 is adapted to be connected to a suitable actuator mechanism 41, for example, a pneumatic actuator.

The actuator stem 40 extends from valve plug 30 through an opening 42 in the valve body 12 opposite the valve bonnet 14 to the actuator mechanism 41. A stem guide 44 is threadably connected within opening 42. The actuator stem 40 passes through the stem guide 44 to the actuator mechanism 41 which is attached to the outer end of the stem guide 44. Conventional packing, here represented by o-ring 46, is retained around the actuator stem 40 within the stem guide 44.

The first seal or port seal 29 is designed so as to require little stem force to shut-off the valve plug 30 leak tight. The first sealing edge of the valve plug 30 is essentially a knife edge that has a small radius rather than a true knife edge so as to be practical for manufacturing purposes. The port seal 29 is well-protected from impingement with the flowing fluid to unsure long life and can be made of either an elastomeric or a plastic material consistent with service conditions.

A feature of this invention is the incorporation into the valve design of a unique second seat means which seats against a second sealing edge on the exterior of the valve plug 30 only when the valve plug 30 is in a closed position against the lower valve seat, the port seal 29. Among the advantages of the upper seal construction of this invention are that no seat-to-seat spacing adjustments are needed, there is no sliding seal friction to adversely affect the positioning of the valve plug, and a minimum of valve stem force is needed to shut-off the valve plug bubble-tight. In operation with the valve plug open, neither the first or port seal 29, nor the second or upper seal 64 are in engagement with the valve plug 30.

The second or upper seal 64 is disposed within a recess in the upper surface 63 of the valve cage 26 and secured between abutting surfaces of the valve cage 26 and the valve bonnet 14. The diameter of the valve plug 30 is increased at the upper end, the end opposite the first sealing edge 30a, so as to form a shoulder with a second sealing edge 30b. The second sealing edge 30b of the valve plug 30, like the first sealing edge 30a, is essentially a knife edge that has a small radius rather than a true knife edge so as to be practical for manufacturing purposes. The upper seal 64 is well protected from impingement with flowing fluid to insure long life and can be made of either an elastomeric or a plastic material consistent with service conditions.

It is to be noted that no adjustment to the valve trim is required to obtain the seat-to-seat dimensions required for tight shut-off of the valve. Both the first or port seal 29 and the second or upper seal 62 are retained by the valve cage while both the first and second sealing edges 30a and 30b are a part of the valve plug 30. The knife edges of the sealing edges 30a and 30b provide the adjustments for variations in tolerances to maintain tight shut-off as each knife edge penetrates each seal a different amount depending upon the tolerances.

The spring 50, compressed within the chamber 33 above the valve plug 30, compensates for the loss of force from fluid flow tending to close the valve plug 30 as the valve plug 30 moves toward the open position.

A valve stem 51, threadably connected to the upper surface of the valve plug 30, extends from the valve plug 30 through an opening in the valve bonnet 14 by extending through a valve stem guide 52 which is threadably connected within an opening in the valve bonnet 14. Conventional packing is used within the valve stem guide 52 to prevent fluid leakage. A nut 53, threadably attached to the external end of the valve stem 51 may be used as a valve position indicator by attaching a scale, not shown, to the top of the valve bonnet 14.

Figure 2:
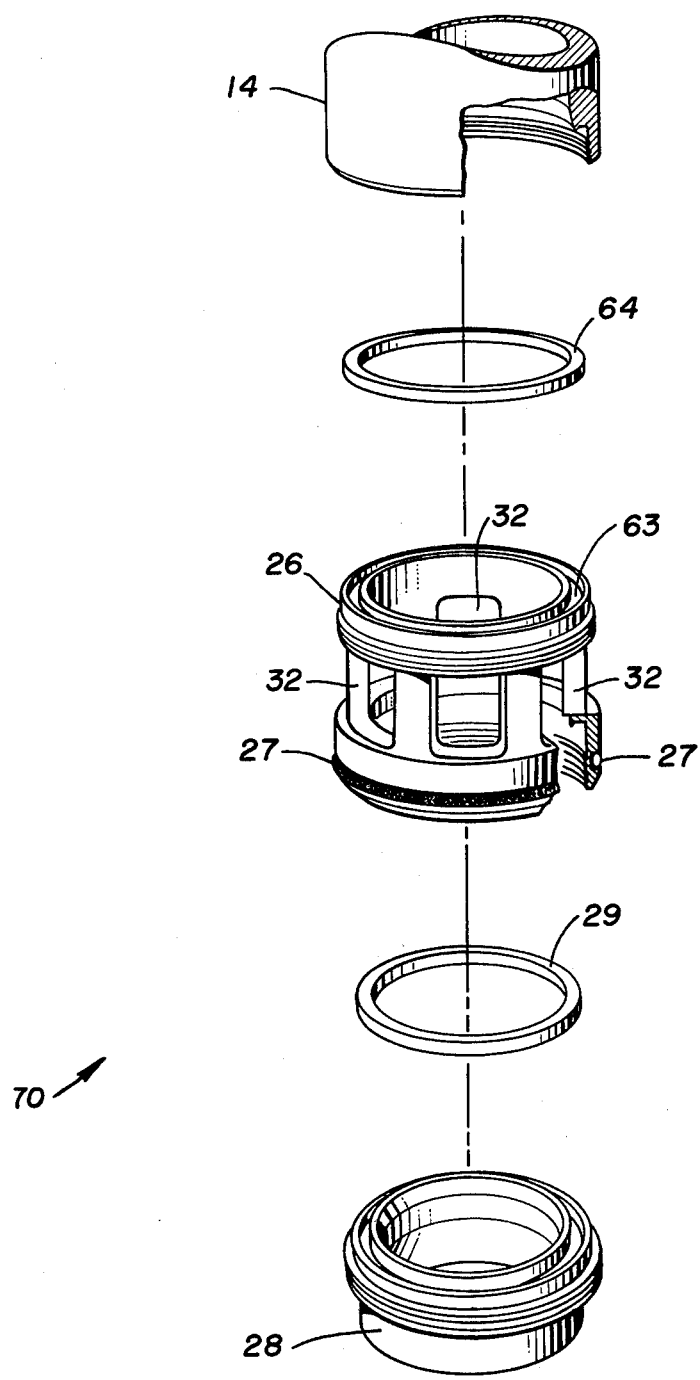
FIG. 2 is a partial exploded view of the elements of the valve cage showing the two seats of the valve shown in FIG. 1.

Referring now to FIG. 2, the elements of the valve trim assembly and the first and second seals are shown. The first or port seal 29 is disposed within a recess in the upper surface of the seat ring 28. The seat ring 28 is threadably connected within the base of the valve cage 26. Seal ring 27, an o-ring, is positioned in a recess about the base of the valve cage 26. The second or upper seal 64 is disposed within a recess in the upper surface 63 of the valve cage 26. The valve cage 26 is threadably connected within the lower part of the valve bonnet 14. Before connecting the valve cage 26 to the lower part of valve bonnet 14, the valve plug 30, the spring 50, and the valve stem 51, each not shown in FIG. 2, must be positioned within the valve cage 26. It can be seen that all of the elements of the valve trim may be assembled as a complete unit, a valve trim assembly 70, before installation within the valve body 12 to provide a quick change trim package for faster maintenance. It can also be seen that dis-assembly and re-assembly of the valve trim assembly for convenient and complete inspection of all parts may be easily and quickly accomplished by a single turning action on the seat ring 28 and valve cage 26, an operation which may be accomplished with a minimum number of common tools. Individual parts or the entire valve trim assembly 70 may easily be replaced.

Figure 3:
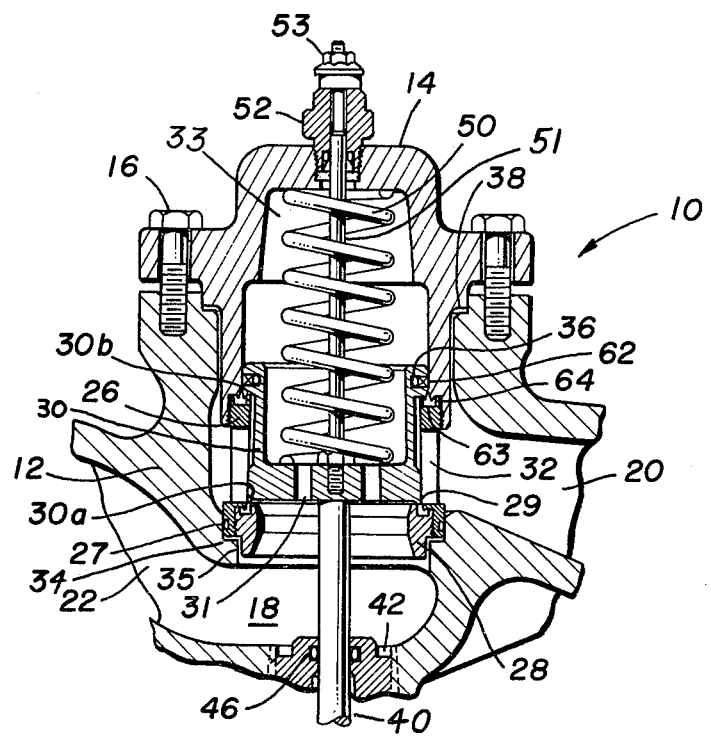
FIG. 3 is a cross-sectional partial view of the valve mechanism of FIG. 1 showing the portion of the valve trim which may be easily removed from the valve according to the principles of the present invention.

Referring to FIG. 3, a view of the valve trim assembly 70 within the valve body 12 is shown. An important advantage of this design is the ease with which the valve trim assembly 70 may be removed from the valve body 12. Removal of the bonnet bolts 16 allows the valve bonnet 14 with the valve trim assembly 70 to be pulled as a unit from the valve body 12. Removal of the valve bonnet 14 and valve trim assembly 70 from the valve body 12 is accomplished without disconnecting the actuator 41, the air supply connections and control lines, or the valve from the piping. Equally important is that no adjustments are required upon reassembly of this valve. For example, the actuator stem 40 and valve plug 30 retain their proper relative position for valve shut-off and operation upon reassemly because the actuator 41 was not removed when the valve was dis-assembled and the valve plug 30 is returned to its identical position by tightening bonnet bolts 16 providing valve body closure seal with gasket 38.

Figure 4:
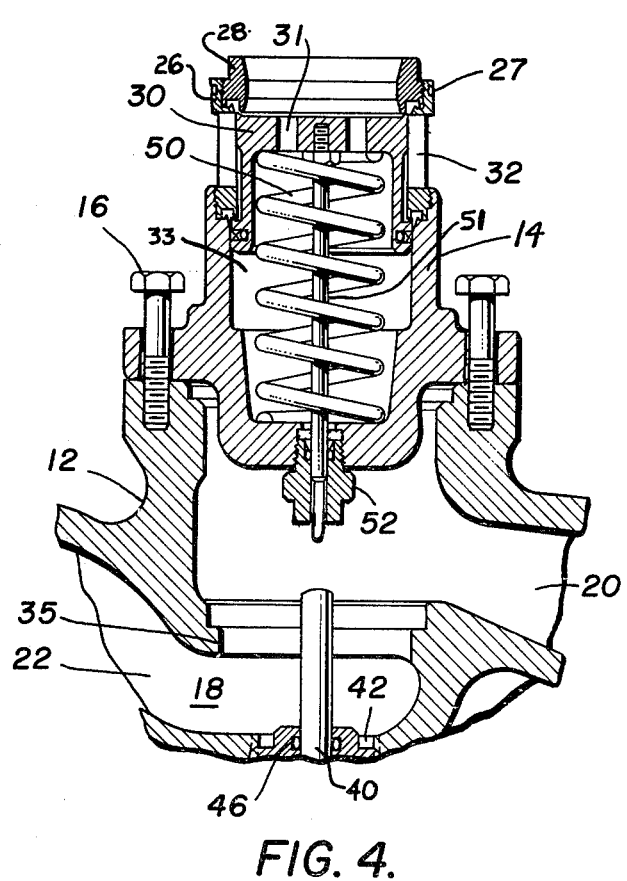
FIG. 4 is a cross-sectional partial view of the valve mechanism of FIG. 1 wherein the valve body is being used as a support and retaining means, or vise, after removal of the valve trim from the valve body.

After removal of the trim from the valve, the trim assembly 70 may be dis-assembled for replacement of parts by using simple tools to turn the seat ring 28 and cage 26. Normally, however, the valve bonnet 14 must be supported or retained so that the seat ring 28 and cage 26 may be turned. FIG. 4 shows the valve body 12 of this invention being used as a support and retaining means, or vise, during dis-assembly of the valve trim assembly 70. After removal of nut 53 from valve stem 51 and removal of the valve bonnet 14 and trim assembly 70 from the valve body 12, the bonnet 14 may be inverted and the bonnet bolts 16 may be reinstalled. In this position the bonnet 14 and trim assembly 70 are held stationary by the valve body 12 so that the trim may easily be inspected and dis-assembled if necessary.

The problem of simplifying maintenance of valves at the work site was recognized and the valve of this invention provides a solution to the problem. The valve may be maintained at the work site using the simplest of tools as the valve body may be used as a support means or vise to aid dis-assembly and re-assembly. Similarly, by its construction, the valve of this invention has eliminated the adjustments normally required in prior art valves for proper valve operation after re-assembly.

Additionally, there has been provided by the present invention an improved valve mechanism incorporating a novel upper sealing means designed to seal only when the valve plug is in the closed valve position against a first valve seat means. As a result of this design in a single-ported double-seated valve, no seat-to-seat spacing adjustments are required. There is no sliding seal friction of the second seat means against the valve plug to adversely effect the positioning of the valve plug. A minimum stem force is required, therefore, to shut off the valve plug bubble-tight.

While there has been shown and described presently preferred embodiments of the invention, it will be understood that the invention is not limited thereto, since it may be otherwise emobodied within the scope of the following claims.

We claim:

1. In a single-ported double-seated valve mechanism having valve body means having an inlet and outlet communicated by a flow passage, a valve bonnet secured to said valve body means, a valve trim assembly disposed within said valve body means, said valve trim assembly having a valve cage including flow openings therein, a seat ring secured to said valve cage, a valve plug having an enlarged upper diameter slidably disposed within said valve cage, and a spring means within said valve plug, the improvement comprising a first and second valve seal and a first and second sealing edge formed on said valve plug cooperating with said first and second valve seals to control fluid flow through said flow openings in said valve cage, said first and second valve seals comprising annular seals, said first seal retained by said seat ring and said second seal retained by said valve cage whereby said first and second valve seals are protected from the fluid flow, said first and second sealing edge comprising a knife edge, said first sealing edge projecting downwardly from the perimeter of the base of said valve plug and said second sealing edge projecting downwardly from the enlarged upper diameter of said valve plug, said first and second sealing edges slightly penetrating said first and second valve seals whereby a leak tight seal may be made without adjustment of seat-to-seat dimensions after dis-assembly and re-assembly.

2. A single-ported double seated valve mechanism comprising valve body means having an inlet and outlet communicated by a flow passage and a chamber positioned within said flow passage, a valve bonnet secured to said valve body means, a valve trim assembly fixedly secured to said bonnet and positioned within said chamber, said valve trim assembly further comprising a valve cage having an upper end and a base, said upper end being connected to said valve bonnet, a seat ring connected to said base of said valve cage, a first seal disposed within a recess in said seat ring, a second seal disposed within a recess in said upper end of said valve cage, and a valve stem, a valve plug and a spring positioned within said valve cage, said bonnet and said valve trim assembly being removable from said valve body means as a unit, said bonnet having a portion outwardly extending from said valve body means, said outwardly extending portion of said bonnet being sized to be received within said chamber within said valve body means, whereby said valve body means serves as a support or vise.

3. The valve mechanism of claim 2 including a valve actuator with an actuator stem, said actuator being attached to said valve body means in a position opposite said valve bonnet, said actuator stem operating said valve plug by pushing only, said actuator stem abutting said valve plug but not being fixedly attached to said valve plug.

* * * * *